(12) United States Patent
Amianti (10) Patent No.: US 12,162,632 B2
(45) Date of Patent: Dec. 10, 2024

(54) REMOTELY PILOTED AIRCRAFT SUITABLE FOR AERIAL SURVEY AND SPRAYING ACTIVITIES, AND AERIAL SURVEY AND SPRAYING SYSTEM

(71) Applicant: XMOBOTS AEROESPACIAL E DEFESA LTDA, São Carlos (BR)

(72) Inventor: Giovani Amianti, Ibaté (BR)

(73) Assignee: XMOBOTS AEROESPACIAL E DEFESA LTDA, Sao Carlos (BR)

( * ) Notice: Subject to any disclaimer, the term of this patent is extended or adjusted under 35 U.S.C. 154(b) by 0 days.

(21) Appl. No.: 17/928,677

(22) PCT Filed: May 17, 2021

(86) PCT No.: PCT/BR2021/050205
§ 371 (c)(1),
(2) Date: Nov. 30, 2022

(87) PCT Pub. No.: WO2021/243428
PCT Pub. Date: Dec. 9, 2021

(65) Prior Publication Data
US 2023/0331406 A1    Oct. 19, 2023

(30) Foreign Application Priority Data
Jun. 2, 2020   (BR) .......................... 1020200110624

(51) Int. Cl.
*B64U 10/20*      (2023.01)
*A01M 7/00*       (2006.01)
(Continued)

(52) U.S. Cl.
CPC ........... *B64U 10/20* (2023.01); *A01M 7/0042* (2013.01); *B64D 1/18* (2013.01); *B64U 10/16* (2023.01);
(Continued)

(58) Field of Classification Search
CPC .... B64U 10/16; B64U 10/20; B64U 2101/20; B64U 2101/32; B64U 2101/45; B64U 2101/47; B64D 1/18; A01M 7/0042
See application file for complete search history.

(56) References Cited

U.S. PATENT DOCUMENTS 9,914,537 B2     3/2018   Wu
10,478,841 B2   11/2019   Harris
(Continued)

FOREIGN PATENT DOCUMENTS

CN    108248860 A    7/2018
CN    109178318 A    1/2019
(Continued)

OTHER PUBLICATIONS

International Search Report for corresponding application PCT/BR2021/050205 filed May 17, 2021; Mail date Jul. 27, 2021.

*Primary Examiner* — Benjamin P Lee
(74) *Attorney, Agent, or Firm* — CANTOR COLBURN LLP (57) ABSTRACT

A system that combines aerial surveying and spraying services in a single remotely piloted aircraft (RPA) popularly known as Drone, in a multirotor configuration, with electric propulsion and power system with hybrid power supply (battery and motor-generator) and vertical take-off and landing (VTOL) system, wherein, the equipment allows, from the coupling of a set comprising aerial survey sensors such as a high definition camera and equipment aimed at spraying activities such as pumps and nozzles, aerial surveying practices, geoprocessing and spraying of chemical substances such as pesticide, herbicide, larvicide, fungicide and fertilizer, or other liquid agricultural products using a single vehicle; a vehicle is also provided that is prepared to carry out the described system, being a remotely piloted aircraft intended for aerial surveying and spraying activities.

13 Claims, 5 Drawing Sheets

(51) Int. Cl.
  *B64D 1/18*    (2006.01)
  *B64U 10/16*   (2023.01)
  *B64U 30/20*   (2023.01)
  *B64U 50/19*   (2023.01)
  *B64U 60/50*   (2023.01)
  *B64U 101/32*  (2023.01)
  *B64U 101/45*  (2023.01)

(52) U.S. Cl.
  CPC .............. *B64U 30/20* (2023.01); *B64U 50/19* (2023.01); *B64U 60/50* (2023.01); *B64U 2101/32* (2023.01); *B64U 2101/45* (2023.01); *B64U 2201/20* (2023.01)

(56) References Cited

U.S. PATENT DOCUMENTS

| | | | | |
|---|---|---|---|---|
| 11,235,874 | B2 * | 2/2022 | Jones | G05D 1/0094 |
| 11,440,659 | B2 * | 9/2022 | Lin | A01M 21/043 |
| 2017/0129605 | A1 * | 5/2017 | Wu | B05B 12/02 |
| 2018/0194484 | A1 | 7/2018 | Livieratos | |
| 2019/0265735 | A1 * | 8/2019 | Ishikawa | G05D 1/0204 |
| 2019/0389577 | A1 * | 12/2019 | Jones | B64D 1/18 |
| 2020/0034616 | A1 | 1/2020 | Lindberg | |
| 2020/0108931 | A1 * | 4/2020 | Zhou | B64C 13/18 |
| 2020/0317318 | A1 * | 10/2020 | Wu | B64C 1/063 |
| 2020/0354059 | A1 * | 11/2020 | Newman | F41H 9/04 |
| 2021/0078706 | A1 * | 3/2021 | Lin | A01C 23/007 |
| 2021/0182978 | A1 * | 6/2021 | Nissing | A01B 79/02 |
| 2021/0245880 | A1 * | 8/2021 | Yan | G06N 3/08 |

FOREIGN PATENT DOCUMENTS

| | | | | |
|---|---|---|---|---|
| CN | 208325641 | A | | 1/2019 |
| CN | 209305844 | A | | 8/2019 |
| CN | 209305844 | U | * | 8/2019 |
| KR | 20190128513 | A | | 11/2019 |
| WO | 2015161352 | A1 | | 10/2015 |
| WO | 2019119204 | A1 | | 6/2019 |
| WO | WO-2020107457 | A1 | * | 6/2020 ............. B64C 1/063 |
| WO | WO-2021243428 | A1 | * | 12/2021 ........... A01M 7/0042 |

* cited by examiner

REMOTELY PILOTED AIRCRAFT SUITABLE FOR AERIAL SURVEY AND SPRAYING ACTIVITIES, AND AERIAL SURVEY AND SPRAYING SYSTEM

FIELD OF INVENTION

The present invention refers to the technological sectors of Mapping, Data Generation also of Agribusiness and deals with a spraying and aerial surveying system in a remotely piloted aircraft (RPA) popularly known as Drone, preferably in multirotor configuration, with hybrid energy supply (battery and motor-generator) and vertical takeoff and landing system (VTOL). This system simultaneously performs aerial survey services such as mapping and geoprocessing combined with the spraying of chemical substances such as herbicides, fungicides, nematicides, pesticides and fertilizers for agriculture.

Furthermore, the present invention refers to equipment prepared specifically for carrying out the system described above, being a remotely piloted aircraft intended for aerial surveying and spraying activities.

BACKGROUND ART

Currently, the technologies and jobs in effect for aerial surveying activities are carried out separately in relation to agricultural spraying activities, so that the simultaneous exercise of the two activities in the same equipment does not exist (drone with aerial surveying and spraying capacity in a single equipment). The costs related to these operations therefore become much higher since the solutions involve the use (acquisition) of different equipment to carry out each of the tasks (a drone for mapping and another for spraying). On the other hand, conventional techniques for spraying chemical products involve: manual applications (kanapback sprayer) that have risks associated with exposure of operators to contact with chemical substances possibly harmful to health, this fact is still recurrent in crops where manual application is quite common, as in the case of vegetable crops, manned aircraft (agricultural aviation) that only allows application in a total area, not allowing localized spraying, use of land vehicles (tractors and self-propelled vehicles) that generate, among other consequences, the trampling and reduction of arable areas, also making it impossible to reach crops that can be grown on slopes or downhills (such as coffee, grapes, among other examples).

We highlight below some teachings of the state of the art that refer to the present matter:

Document CN109677614, entitled "PLANT PROTECTION DRONE", describes a remotely piloted aircraft (RPA) for application in agriculture, with spray actuators, but does not describe any aerial survey sensor that helps or complements its operation and, consequently, is not capable of performing an aerial survey.

Document CN109073375, entitled "A METHOD AND APPARATUS FOR MEASURING A SPRAY AREA", describes an RPA with applications in the field of agriculture, with spray actuators for pesticides and a camera to facilitate the device's direction controls and guide the spraying of these pesticides and/or optimize the spray area. However, this device does not use the aerial survey sensor (camera, lidar, radar) to collect or interpret data to obtain information about the terrain over which the device flies and does not mention the possibility of performing an aerial survey based on the data and/or captured images. Therefore, it does not solve the problem that the present invention proposes to solve. It becomes a video camera that allows the operator to see the ground, but does not allow the georeferencing of this information.

Documents CN108719242 and US 20180354624, entitled "PESTICIDE SPRAYING SYSTEM" and "DRONE FOR AGRICULTURE", respectively describe RPAs intended for spraying pesticides in agricultural fields. The system uses a camera to facilitate the navigation of the device by the driver and uses a module to trace the best route, taking into account the limit of the terrain. This device also does not carry out data collection on the state of health and development of crops, detection of possible areas of erosion or planting failures.

Document JP2019060641, entitled "AERIAL MARKING, ANALYSIS DEVICE, AND DRONE AIRBORNE SURVEY SYSTEM", describes an RPA capable of performing aerial surveys through data and image collection, but does not anticipate applications in the field of agriculture that, in fact, as also observed in the previous teachings, are not obviously related to the field of aerial prospection, and therefore, it also does not solve the problems that the present invention proposes to solve.

Therefore, there is no state-of-the-art solution equivalent to the one presented here in the present invention that combines technical differentials, economic advantages, safety and reliability.

OBJECTIVES OF THE INVENTION

Thus, it is an objective of the present invention to provide a vehicle capable of performing aerial survey, geoprocessing and crop spraying services in the same product.

It is another objective of the present invention to provide a remotely piloted aircraft intended for aerial surveying and spraying activities.

It is another objective of the present invention to provide a vehicle that allows spraying products over a plantation without trampling crops enabling aerial surveying and spraying activities made possible in the same technical solution.

It is another objective of the present invention to provide a vehicle that enables savings in agrochemicals in spraying exercises.

It is another objective of the present invention to provide data collection on state of plant health (phytosanitary) and crop development, detection of possible areas of erosion or planting failures and more effective and georeferenced spraying of agents.

It is another objective of the present invention to provide a solution that mitigates environmental impacts and maximizes the soil preservation process.

It is another objective of the present invention to provide operation in areas of difficult access with capture and processing of images together with the treatment of areas with spraying of chemical agents.

It is another objective of the present invention to provide a system for mapping crops and plantations with a high degree of accuracy.

SUMMARY OF THE INVENTION

The present invention achieves these and other objectives by means of an Aircraft (1) remotely piloted indicated to carry out flights over different areas, comprising:
 an aerial surveying system;
 a spraying system;

being for joint activities or interspersed or selected among aerial survey and spraying.

The present invention also achieves these and other objectives by means of a remotely piloted aircraft indicated to carry out flights over agricultural areas including aerial survey and spraying, comprising:
- a body that is arranged centrally in said aircraft connected to six spaced apart of speed controller/engine/propeller assemblies;
- a fuel or pesticide storage tank above said body;
- a fixed landing gear attached to the lower portion of the body;
- a motor-generator attached to the lower portion of the body;
- Spray nozzles positioned at the bottom of the speed controller/engine/propeller assemblies;
- arms that connect the body to the speed controller/engine/propeller assemblies and through which the chemical agent distribution hoses pass;
- a sensor holder positioned below the body;
- an aerial survey sensor such as cameras, lidar, sar located on said support.

The present invention achieves these and other objectives through a system capable of carrying out aerial surveying, geoprocessing and spraying of chemical agents comprising:
- an aircraft as described above;
- navigation, control and guidance system from inertial sensors, magnetic sensors, pressure sensors, radars, laser and gnss coupled in micro-controller and embedded processors;
- aircraft mission planning software (Drone), pre-processing and geolocation software for data from aerial survey sensors, data processing software from aerial survey sensors, point cloud analysis software, models and maps generated by the processing software;
- chemical agents to be inserted in the tank present in the aircraft.

BRIEF DESCRIPTION OF THE DRAWINGS

The present invention will be described based on the accompanying drawings, which illustrate.

DETAILED DESCRIPTION OF THE INVENTION

The present invention refers to an aerial surveying and spraying system performed by a single remotely piloted aircraft (RPA) popularly known as Drone. This aircraft presents a multirotor configuration, with electric propulsion and hybrid power (battery and motor-generator) and a vertical takeoff and landing system (VTOL).

This aircraft allows, from the coupling of a high definition camera and equipment for spraying activities, the exercise of both purposes in the same product concept, enabling practices of mapping, geoprocessing and spraying of chemical substances such as pesticides, herbicides, larvicide, fungicide and fertilizer, or other liquid products for agriculture.

The development of this vehicle has the main objective of responding effectively to the limitations presented for the state of the art. In response, a multirotor Drone aircraft with a VTOL system was developed, having an aerial survey sensor attached to its structure (as an example, an aerophotogrammetric camera 11) for capturing and processing signals and images, geoprocessing and a spraying system.

The present invention enables the operation of spraying products without trampling crops, with the possibility of aerial surveying and spraying activities made possible in the same technical solution, with a high degree of accuracy depending on the type of sensor 11 used.

Figure 4:
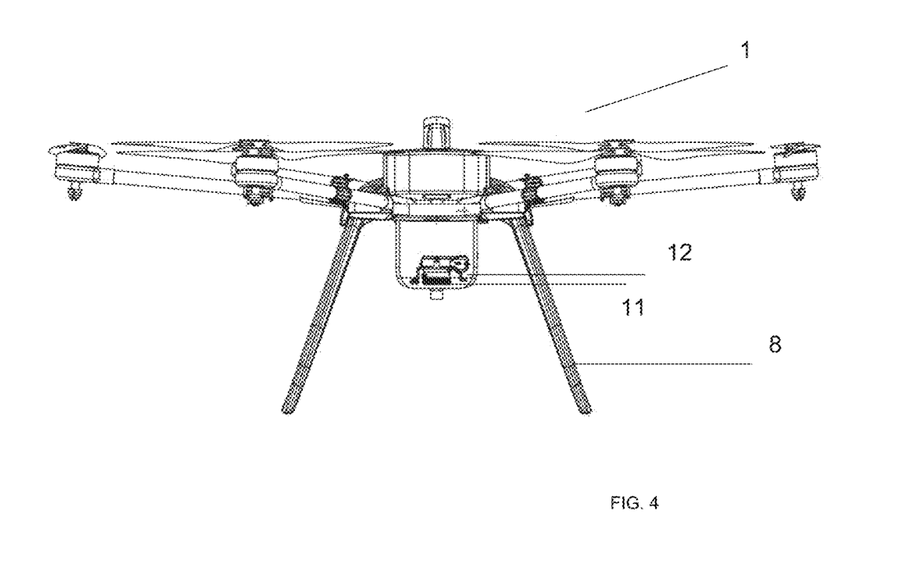
FIG. 4 illustrates the location of the aerial survey sensor present in the aircraft for aerial survey, geolocation and spraying, which is object of the present invention.

Still, in a preferred embodiment, an aerophotogrammetric camera 11 is used as a sensor with strategic positioning in the structure of the aircraft 1, with possible movement in its 3 axes, as can be seen from FIG. 4.

The solution brought with the present invention also enables a saving of agrochemical product in the spraying exercises, since from the surveying and previous processing of signals and images, it is possible to apply the designated agrochemical, only in the areas where there is a real need.

As can be seen from FIGS. 1 to 7, aircraft 1 comprises batteries 2 and 3, motor-generator 17, storage tank 4, at least four propulsion assemblies composed of speed controller/engine/propeller 5, and may comprise up to eight propellers 5, preferably six propellers 5, fixed landing gear 8, coupling arm 9 between propeller assembly 5 and body 1 inside which passes the agent distribution hose 15 and spray nozzles 10.

Figure 1:
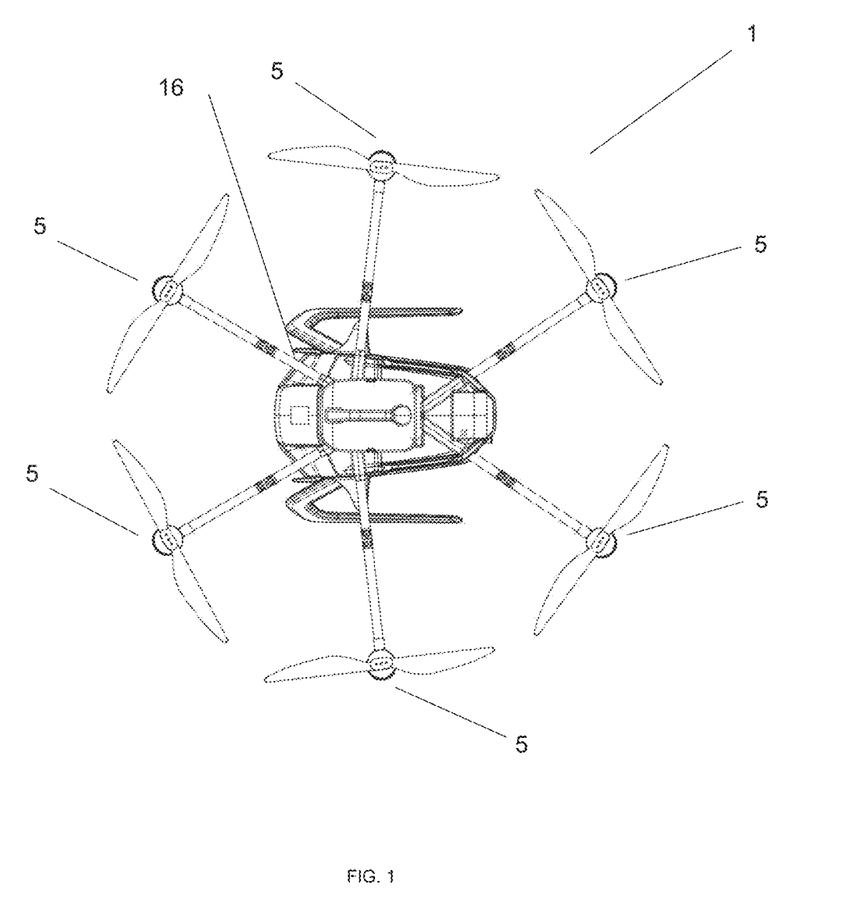
FIG. 1 illustrates the top view of the aircraft for mapping and spraying, which is the object of the present invention.
Figure 2:
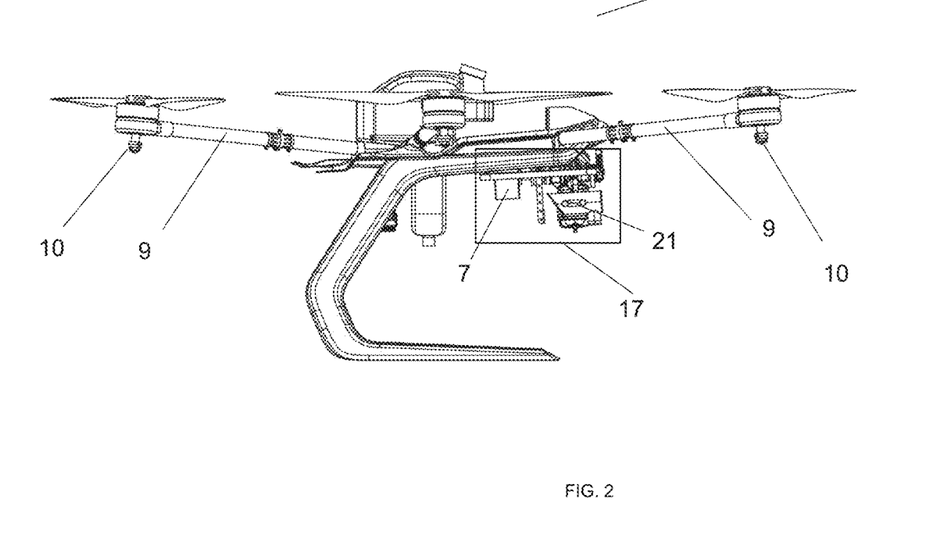
FIG. 2 illustrates the side view of the aircraft for mapping and spraying, which is object of the present invention.
Figure 3:
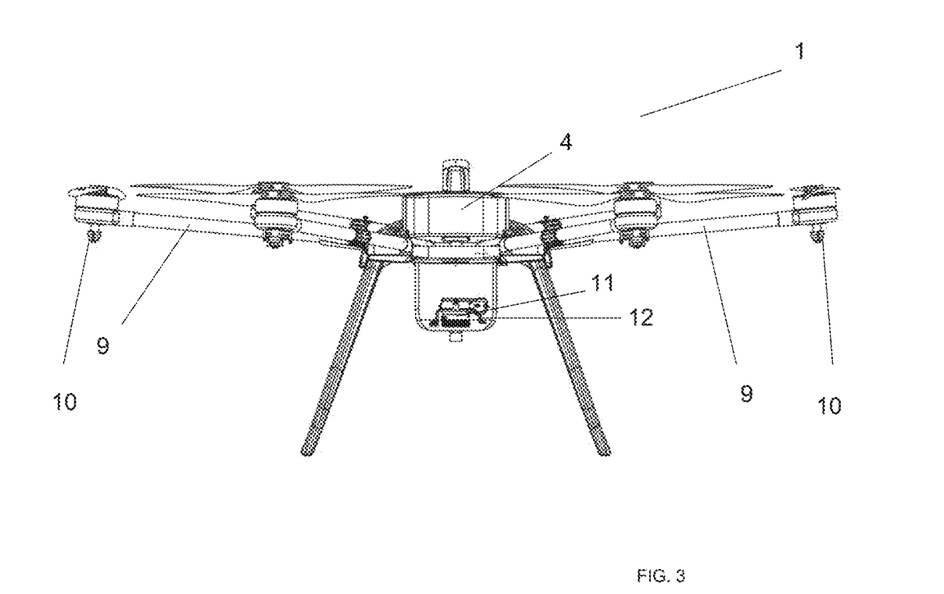
FIG. 3 illustrates the front view of the aircraft for mapping and spraying, which is object of the present invention.

Storage tank 4 can be used both for the allocation of fuel and for the allocation of agrochemicals destined respectively for aerial surveying and spraying activities, having qualification and level of protection consistent with the intended exchange of solutions.

Preferably, aircraft 1 is about 70 cm high and about 246 cm wide.

Thus, the aircraft 1 of the present invention has the function of aerial surveying and spraying, showing an agroenvironmental solution resulting, in particular, from the coupling of an aerial survey sensor with a high definition aerial photogrammetric camera 11 for mapping and a spraying system. It is, in a preferred embodiment, a multirotor Drone, with electric propulsion and hybrid power system composed of battery 2 and motor-generator 17 and vertical landing and takeoff system (VTOL).

This aircraft 1 makes it possible to operate in areas of difficult access, allowing the capture and processing of signals and images, and the treatment of areas with the spraying of chemical agents, synthesizing the actions in the same equipment. In addition, it is also possible to collect data on the state of health and development of crops, detection of possible areas of erosion or planting failures and more effective and georeferenced spraying of agents, with the action of aircraft 1 a mitigating factor for environmental impacts and a maximization of the soil preservation process.

Electric propulsion with a hybrid power system, in addition to providing greater equipment savings, enables the exchange of activities.

Figure 5:
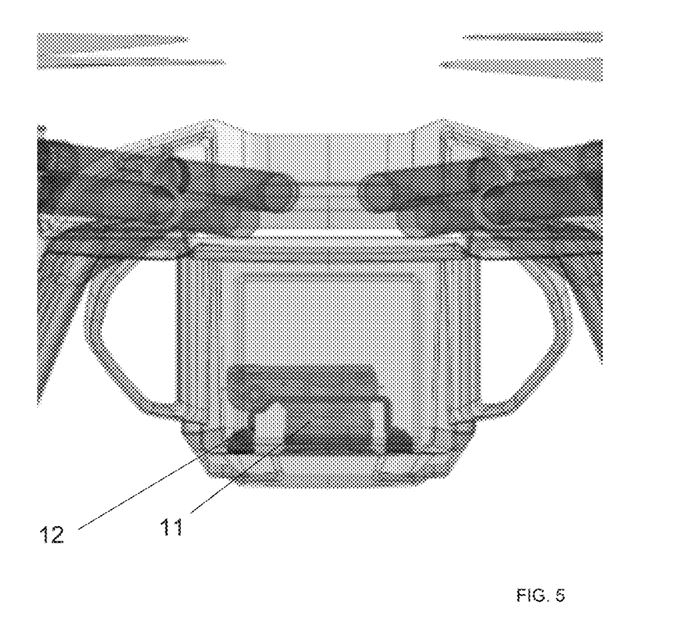
FIG. 5 illustrates a support detail and an example of a sensor and an aerial survey, in this case an aerophotogrammetric camera included in the aircraft for mapping and spraying, which is object of the present invention.

The aircraft 1, used for aerial survey activities, comprises a support 12 installed at the bottom of said aircraft 1 and the aerial survey sensor, as an example, the aerophotogrammetric camera 11, which can be of 1 or more spectra. In this specific example, the aerial survey sensor is an aerophotogrammetric camera 11 that captures images in five spectral bands, namely blue, green, red, red-edge and infra-red. The airborne camera sensor 11 is strategically fixed at the bottom of the aircraft structure 1 and pointed downwards, so that it is possible to capture signals and images from the ground while the aircraft 1 flies over the area of interest, without risk of occlusion by the landing gear structure 8.

The command of the aerophotogrammetric sensor is carried out by the same control unit responsible for navigation, control and guidance of the aircraft 1. In the aerial survey mode, there is a mission planning software that receives from the user the desired frontal and lateral overlap parameters, in addition to the necessary resolution for the survey and thus automatically calculates the trajectory and flight height of the aircraft 1.

During the flight, the software uses the geographic coordinates obtained from the navigation unit in real time to identify the right moment to send the command from the aerial survey sensor (for example, a photo shot). At each photo shot command sent, the system stores the coordinates and data of the inertial unit of aircraft 1 at that moment in a file. The data and/or signals from the aerial survey sensors are stored on the sensor card 11. After the flight, a set of software pre-processes, processes and analyzes the signals and data.

Thus, in the drone, the user can generate application maps and even treat the plantations, whether by spraying pesticides, herbicides, larvicides, fertilizers, among other chemical agents usually used in crops and plantations.

FIG. 1 represents the spraying system composed of a tank for storing pesticides 4 with a quick coupling mechanism 13 to facilitate the exchange of fuel tanks that were used in the aerial survey stage for a pesticide tank, an electric pump for inputs 14, distribution network through 15 hoses and 10 spray nozzles, designed for assertive spraying.

The system configuration preferably consists of 4 interchangeable spray nozzles, located below the side and rear propellers 5, each of the nozzles on each propeller 5. The tank of agrochemicals 4 is positioned in the upper-central part of the aircraft 1 to allow quick changes preventing aircraft 1 from remaining longer on the ground, followed by a quick coupling mechanism 13.

Figure 6:
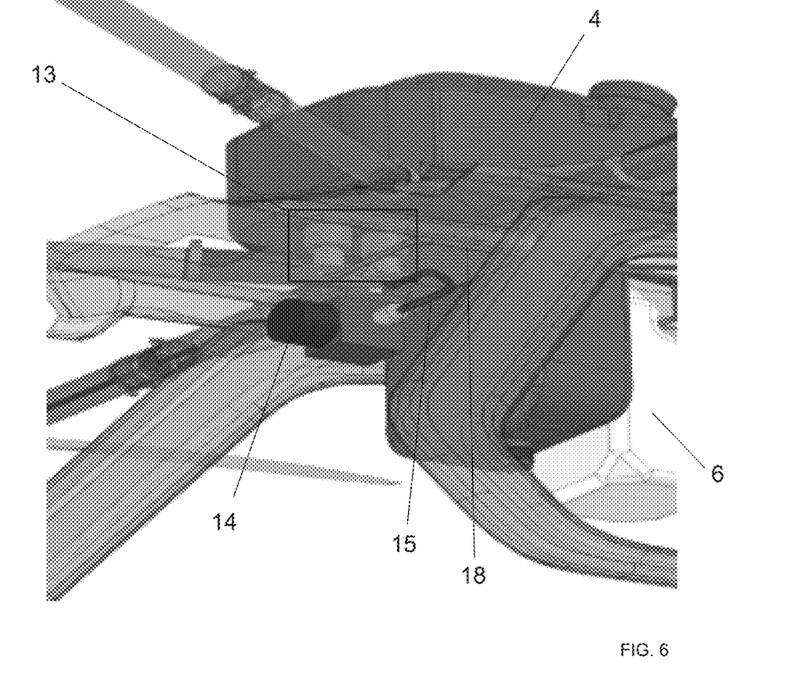
FIG. 6 illustrates detail of the coupling mechanism included in the aircraft for mapping and spraying object of the present invention.

The quick coupling mechanism 13 is detailed in FIG. 6 and is composed of two front and rear contact valves 19 and 20 remaining in a closed position when not in contact with the tank valve pin. When the tank valve pin is installed in the tank in the frontal position, when the tank is inserted in the drone, the contact valve 20 opens, allowing the fluid to pass from the tank to the fuel line 18 that goes to the reserve tank 6. When the tank valve pin is installed on the tank in the rear position, when the tank is inserted in the drone, the rear valve 19 opens, allowing the fluid to pass from the tank to the agent distribution hoses 15 that go to the spray pump 14. So the same tank model is used in different positions for water tank (spray case) or fuel tank (aerial survey cases including longer missions).

The present invention also refers to a system for carrying out aerial surveying and spraying activities of chemical agents comprising:

an aircraft 1;
a navigation, control and guidance system based on inertial sensors, magnetic sensors, pressure sensors, radars, laser and gnss coupled to a micro-controller and embedded processors;
software including aircraft mission planning software 1, pre-processing and geolocation of data from air survey sensors, processing data from air survey sensors, analysis of point clouds, models and maps generated by the processing software;
chemical agents to be inserted in tank 4 present in aircraft 1.

This system allows spraying on crops, livestock, among other areas of interest, chemical agents to be inserted into tank 4 present on aircraft 1 selected from among pesticides, herbicides, larvicides, fungicides and fertilizers, or other liquid products.

Furthermore, this system may comprise:
air survey sensor 11 capture signals and images in one or more spectral bands;
a mission planning software for aircraft 1 with parameters of frontal and/or lateral overlap, resolution required with automatic calculation of the trajectory and flight height of aircraft 1;
an aircraft mission planning software 1 for spraying purposes with parameters of geolocation of individuals or dead spots and lateral superimposition with automatic calculation of the trajectory and flight height of the aircraft 1;
a software for pre-processing and geolocation of the data from the aerial survey sensors to perform the download of the data collected by the aircraft 1, post-processed georeferencing of the data collected by the aircraft 1, geometric, radiometric and spectral calibration of the data collected by the aircraft 1;
a software for processing data from aerial survey sensors, for aerial triangulation, direct georeferencing, generation of 3D point cloud, digital surface model, digital terrain model, and maps or orthomosaics of the data collected by the aircraft 1;
a software for analysis of point clouds, models and maps generating as results counts of individuals (each plant), planting lines (rows of plants), planting failures, parallelism, detection of invasive plants located in individuals or detection of dead spots of invasive plants (regions), identification of the invasive species, identification of healthy or diseased plants.

Figure 7:
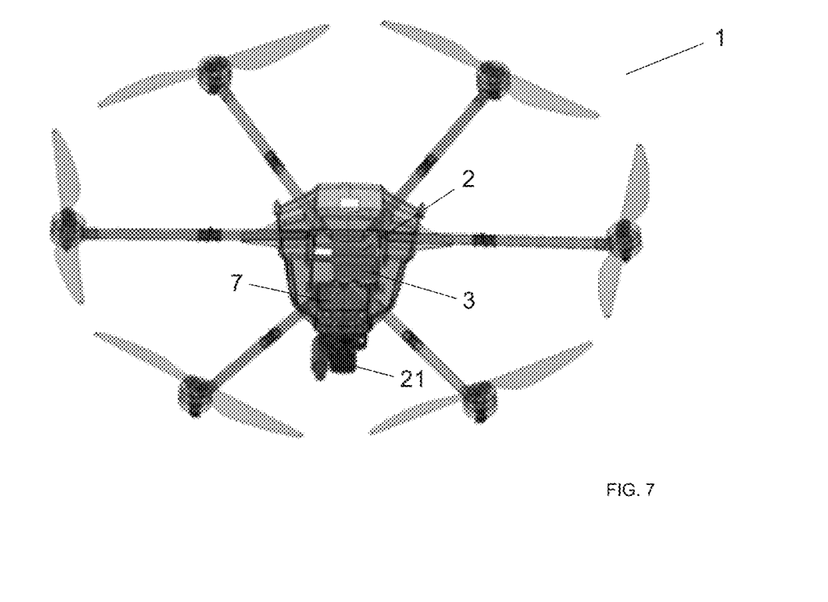
FIG. 7 illustrates detail of the components of the aircraft power system for mapping and spraying, which is object of the present invention.

FIG. 7 represents the power system of the aircraft 1 for aerial surveying and spraying, composed of batteries 2 and 3, motor-generator 17 composed of a combustion engine 21 coupled to the generator 7 constituting the drone's power system, with voltage at the output preferably from 48V.

FIG. 1 is also representative of the body of the aircraft 16 for aerial surveying and spraying to protect systems and architectures subject to the effects of weathering the spraying mission such as weather conditions.

Figure 8:
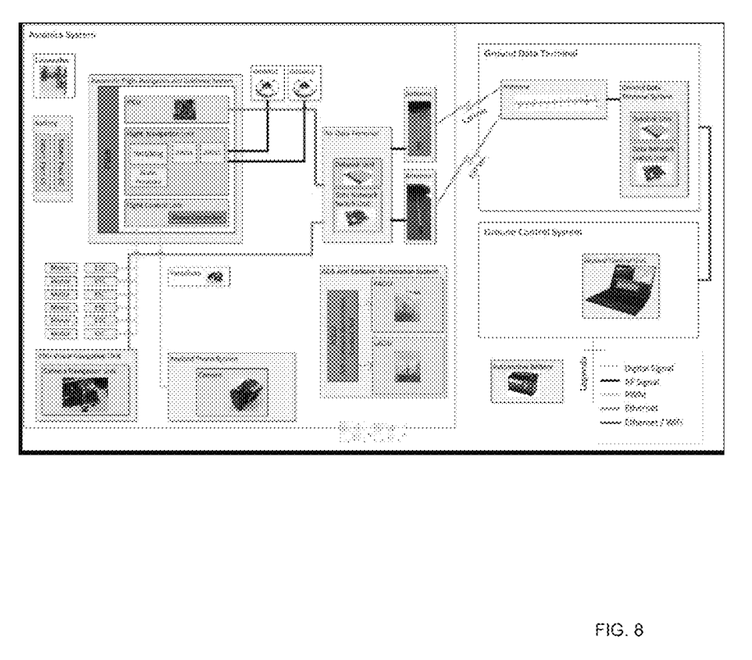
FIG. 8 illustrates the aircraft signals diagram for mapping and spraying, which is object of the present invention.

FIG. 8 represents the electrical and signal diagrams of aircraft 1.

The present invention presents numerous technical and economic advantages when compared to the state of the art, some of which are listed below:
vehicle capable of performing aerial surveying, geoprocessing and plantation spraying services;
enables spraying of products on a plantation without trampling crops;
enables agrochemical product savings in spraying exercises;

performs data collection and results in individual counts (each plant), planting lines (rows of plants), planting failures, parallelism, detection of invasive plants located in individuals or detection of dead spots of invasive plants (regions), identification of invasive plant species, identification of healthy or diseased plants, allowing for the correct planning of where to apply the agrochemicals;

is a solution that mitigates environmental impacts and maximizes the process of soil preservation;

performs operations in areas of difficult access with capture and processing of signals and images along with treatment of areas with spraying of chemical agents;

avoids risk associated with exposure of operators to contact with chemical substances possibly harmful to health, a fact that still recurs in cultures where manual application is quite common;

is an aerial survey system for crops and plantations with a high degree of accuracy.

Having described an example of a preferred embodiment of the present invention, it should be understood that the scope of the present invention covers other possible variations of the described inventive concept, being limited solely by the content of the appended claims, including the possible equivalents.

The invention claimed is:

1. An aircraft remotely piloted indicated to carry out flights over different areas, comprising:
    an aerial surveying system;
    a spray system;
    a body arranged centrally on said aircraft connected to at least four propulsion assemblies equally spaced from each other;
    a storage tank above said body;
    a motor generator fixed in the lower portion of the body;
    a system for aerial surveying activities and a system for spraying activities,
    wherein the spray system comprises
        spray nozzles positioned on a bottom of each of the at least four propulsion assemblies; and
        chemical agents distribution hose system located inside, which connect the tank to a pressurizing pump and then to the spray nozzles;
    where the aerial survey system comprises:
        a support positioned below the body; and
        one or more aerial survey sensors comprising at least one of photographic cameras, video cameras, laser, LIDAR, radars, magnetometers, and environmental sensors, located in said support;
    the aircraft further comprising:
    a quick coupling mechanism for the connection of two types of tanks, wherein a fuel tank has a front coupling that connects to a fuel line and the chemical agent tank has a rear coupling that makes the connection with an agent distribution hose,
    a chemical agent pump,
    a distribution network via hoses, and
    spray nozzles;
    wherein the aircraft is configured for carrying out simultaneous aerial surveying and spraying activities.

2. The aircraft, according to claim 1, wherein the support is located centrally below the body.

3. The aircraft, according to claim 1, wherein the support is located close to a landing gear.

4. The aircraft, according to claim 1, wherein the camera is RGB or multispectral.

5. The aircraft, according to claim 1, further comprising multirotor and hybrid power supply configuration, and vertical takeoff and landing system.

6. The aircraft, according to claim 1, comprising:
    quick coupling mechanism for the connection of two types of tanks, wherein a fuel tank has a front coupling that connects to a fuel line and the chemical agent tank has a rear coupling that makes the connection with an agent distribution hose,
    a chemical agent pump,
    a distribution network via hoses,
    spray nozzles.

7. The aircraft, according to claim 1, further comprising:
    batteries,
    a motor-generator,
    a reserve tank.

8. A system for carrying out aerial surveying and spraying activities of chemical agents, comprising:
    an aircraft as defined in claim 1;
    navigation, control and guidance system from inertial sensors, magnetic sensors, pressure sensors, radars, laser and GNSS coupled to micro-controller and embedded processors;
    a non-transitory computer readable storage medium that configures a computer for mission planning of the aircraft, pre-processing and geolocation of aerial survey sensor data, aerial survey sensor data processing, point cloud analysis, and generating models and maps generated;
    chemical agents to be inserted into the tank.

9. The system according to claim 8, wherein the g chemical agents to be inserted into the tank present in the aircraft are selected from among pesticide, herbicide, larvicide, fungicide and fertilizer, or other liquid products.

10. The system according to claim 8, wherein the aerial survey sensor captures signals and images in one or more spectral bands.

11. The system according to claim 8, wherein the computer readable storage medium is configured with geolocation of data from the aerial survey sensors for downloading the data collected by the aircraft, post-processed georeferencing of the data collected by the aircraft, geometric, radiometric and spectral calibration of the data collected by the aircraft.

12. The system according to claim 8, wherein the computer readable storage medium is configured for processing data from aerial survey sensors, for aerial triangulation, direct georeferencing, 3D point cloud generation, digital surface model, digital terrain model, and maps or orthomosaics of data collected by the aircraft.

13. The system according to claim 8, wherein the computer readable storage medium is configured for analyzing point clouds, models and maps, generating as a result counts of individuals (each plant), planting lines (rows of plants), failure of planting, parallelism, detection of invasive plants located in individuals or detection of dead spots of invasive plants (regions), identification of the invasive species, identification of healthy or diseased plants.

* * * * *